(12) United States Patent
Chan et al.

(10) Patent No.: US 7,889,466 B2
(45) Date of Patent: Feb. 15, 2011

(54) FAULT CIRCUIT INTERRUPTER WITH BI-DIRECTIONAL SENSING

(75) Inventors: David Y. Chan, Bellerose, NY (US); Steve Campolo, Malverne, NY (US); Mario Angelides, Oceanside, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 12/114,465

(22) Filed: May 2, 2008
(Under 37 CFR 1.47)

(65) Prior Publication Data
US 2009/0273866 A1 Nov. 5, 2009

(51) Int. Cl.
*H02H 3/00* (2006.01)
(52) U.S. Cl. .......................................... 361/45; 361/42
(58) Field of Classification Search ................... 361/45, 361/42
See application file for complete search history.

(56) References Cited

U.S. PATENT DOCUMENTS

| | | | |
|---|---|---|---|
| 3,668,471 | A | 6/1972 | Ambler et al. |
| 4,568,997 | A | 2/1986 | Bienwald et al. |
| 5,418,678 | A | 5/1995 | McDonald |
| 5,541,800 | A | 7/1996 | Misencik |
| 5,661,623 | A | 8/1997 | McDonald et al. |
| 5,706,155 | A | 1/1998 | Neiger et al. |
| 5,729,417 | A | 3/1998 | Neiger et al. |
| 5,793,587 | A * | 8/1998 | Boteler ..................... 361/42 |
| 6,052,265 | A | 4/2000 | Zaretsky et al. |
| 6,246,558 | B1 | 6/2001 | DiSalvo et al. |
| 6,417,581 | B2 | 7/2002 | Hall et al. |
| 6,437,700 | B1 | 8/2002 | Herzfeld et al. |
| 6,522,510 | B1 | 2/2003 | Finlay et al. |
| 6,621,388 | B1 | 9/2003 | Macbeth |
| 6,657,839 | B2 | 12/2003 | de Oliveira |
| 6,693,779 | B2 | 2/2004 | DiSalvo |
| 6,724,590 | B1 | 4/2004 | Radosavljevic et al. |
| 6,771,152 | B2 | 8/2004 | Germain et al. |
| 6,807,035 | B1 | 10/2004 | Baldwin et al. |
| 6,807,036 | B2 | 10/2004 | Baldwin |
| 6,920,025 | B2 | 7/2005 | Nelson |
| 6,937,452 | B2 * | 8/2005 | Chan et al. ..................... 361/42 |
| 7,187,526 | B2 | 3/2007 | DiSalvo |
| 7,196,886 | B2 | 3/2007 | Chan et al. |
| 7,298,598 | B1 | 11/2007 | Morgan et al. |

(Continued)

FOREIGN PATENT DOCUMENTS

WO WO 2004 070901 8/2004

(Continued)

OTHER PUBLICATIONS

U.S. Appl. No. 12/132,598.

*Primary Examiner*—Stephen W Jackson
*Assistant Examiner*—Angela Brooks
(74) *Attorney, Agent, or Firm*—Collard & Roe, P.C.

(57) ABSTRACT

A bi-directional fault circuit interrupter system having mis-wiring protection via numerous different poles. There are at least three different transformers wherein at least two of the transformers are differential transformers and at least one transformer is a neutral transformer. There is also at least one actuator which is used to switch the switches back and forth to selectively connect the electrical current to the fault circuit.

34 Claims, 7 Drawing Sheets

U.S. PATENT DOCUMENTS

| | | |
|---|---|---|
| 7,375,935 B2 * | 5/2008 | Chan et al. .................... 361/42 |
| 7,542,252 B2 * | 6/2009 | Chan et al. .................... 361/42 |
| 7,558,034 B2 | 7/2009 | Bonasia et al. |
| 2005/0030685 A1 * | 2/2005 | DiSalvo ....................... 361/42 |
| 2005/0117264 A1 | 6/2005 | Aromin |
| 2005/0280962 A1 | 12/2005 | Chan |
| 2006/0268472 A1 | 11/2006 | Winch |
| 2007/0268635 A1 | 11/2007 | Bonasia et al. |
| 2007/0274012 A1 | 11/2007 | Bonasia et al. |
| 2009/0086389 A1 | 4/2009 | Huang et al. |
| 2009/0086390 A1 | 4/2009 | Huang |
| 2009/0128264 A1 | 5/2009 | Disalvo |
| 2009/0161271 A1 | 6/2009 | Huang et al. |

FOREIGN PATENT DOCUMENTS

WO    WO 2007 137180    11/2007

\* cited by examiner

FAULT CIRCUIT INTERRUPTER WITH BI-DIRECTIONAL SENSING

BACKGROUND OF THE INVENTION

Field of the Invention

The invention relates to a ground fault circuit interrupter with bi-directional sensing and/or automatic switching circuitry which provides reverse wiring and ground fault protection without user intervention, in the case of mis-wiring. If a GFCI is wired incorrectly with line and load reversal, current GFCI's in the market would require an electrician to rewire the GFCI correctly. Other patents that generally relate to fault circuits include U.S. Pat. No. 4,595,894 to Doyle et al. and which issued on Jun. 17, 1986; U.S. Pat. No. 5,706,155 to Neiger et al. which issued on Jan. 6, 1998; U.S. Pat. No. 5,715,125 to Neiger et al. which issued on Feb. 3, 1998; U.S. Pat. No. 6,426,558 to DiSalvo et al. which issued on Jun. 12, 2001; U.S. Pat. No. 6,937,452 to Chan et al. which issued on Aug. 30, 2005; U.S. Pat. No. 7,049,910 to Campolo et al. which issued on May 23, 2006; U.S. Pat. No. 7,196,886 to Chan et al. which issued on Mar. 27, 2007, wherein the disclosures of these patents are hereby incorporated herein by reference in their entirety.

SUMMARY OF THE INVENTION

The invention relates to a bi-directional switching system for a fault circuit having a plurality of transformers comprising at least one differential transformer and at least one grounded neutral transformer. There are at least two electrical connection interfaces comprising at least one first or default-line interface and at least one second or default load interface for connection to branch circuit wires, a plurality of electrical conductors extending from at least two electrical connection interfaces, and the plurality of transformers. These electrical conductors include at least one conductor for electrical connection to the line interface, and at least one conductor for electrical connection the load interface. There is also a conductor for electrical connection to at least one of the transformers and a plurality of switching poles for switching between at least one line interface or at least one load interface.

There is also at least one actuator for selectively switching at least one of the plurality of switches or switching poles depending on whether an electrical connection is made from at least one power line to the line interface and the load interface.

There can also be at least one additional differential transformer which is used to provide fault protection when the system is wired with power from the load or second side.

BRIEF DESCRIPTION OF THE DRAWINGS

Other objects and features of the present invention will become apparent from the following detailed description considered in connection with the accompanying drawings which disclose the different embodiments of the invention.

In the drawings, wherein similar reference characters denote similar elements throughout the several views.

DETAILED DESCRIPTION OF PREFERRED EMBODIMENTS

Referring to the embodiments shown in the drawings, there are a plurality of different switches which are used to selectively connect fault circuit components to transformers or to power. For example, a first set of switches are used to selectively switch between a first position and a second position to selectively connect to fault circuit components. These fault circuit components can be any one of an integrated circuit, a microprocessor, a bridge rectifier, a bi-directional relay, a reset switch or any other suitable component. If the component is an integrated circuit, it is switched to couple to either the windings a first differential transformer or the windings of a second differential transformer depending on whether a power line is coupled to a first interface or a load line or second interface.

A second set of switches are used to selectively switch between a first position and a second position to selectively connect an integrated circuit and/or other fault circuit components to power input depending on whether a power line is coupled to a power line interface or a load line interface. In this case, while an integrated circuit may be used, other fault circuit components such as a microprocessor, may be used instead. In addition, the switches can also be used to switch among other non integrated circuit type fault circuit components as well such as rectified bridges, forming a power supply, transistors or any other desired component.

A third type of switch or set of switches, is used to control a bi-directional relay. The bi-directional relay is used to control the first and second set of switches.

Another switch or set of switches is used to selectively control connection to a reset switch such as a reset lockout switch.

Any combination of the above switches can be implemented with the configurations shown in FIGS. 1-6.

Figure 1:
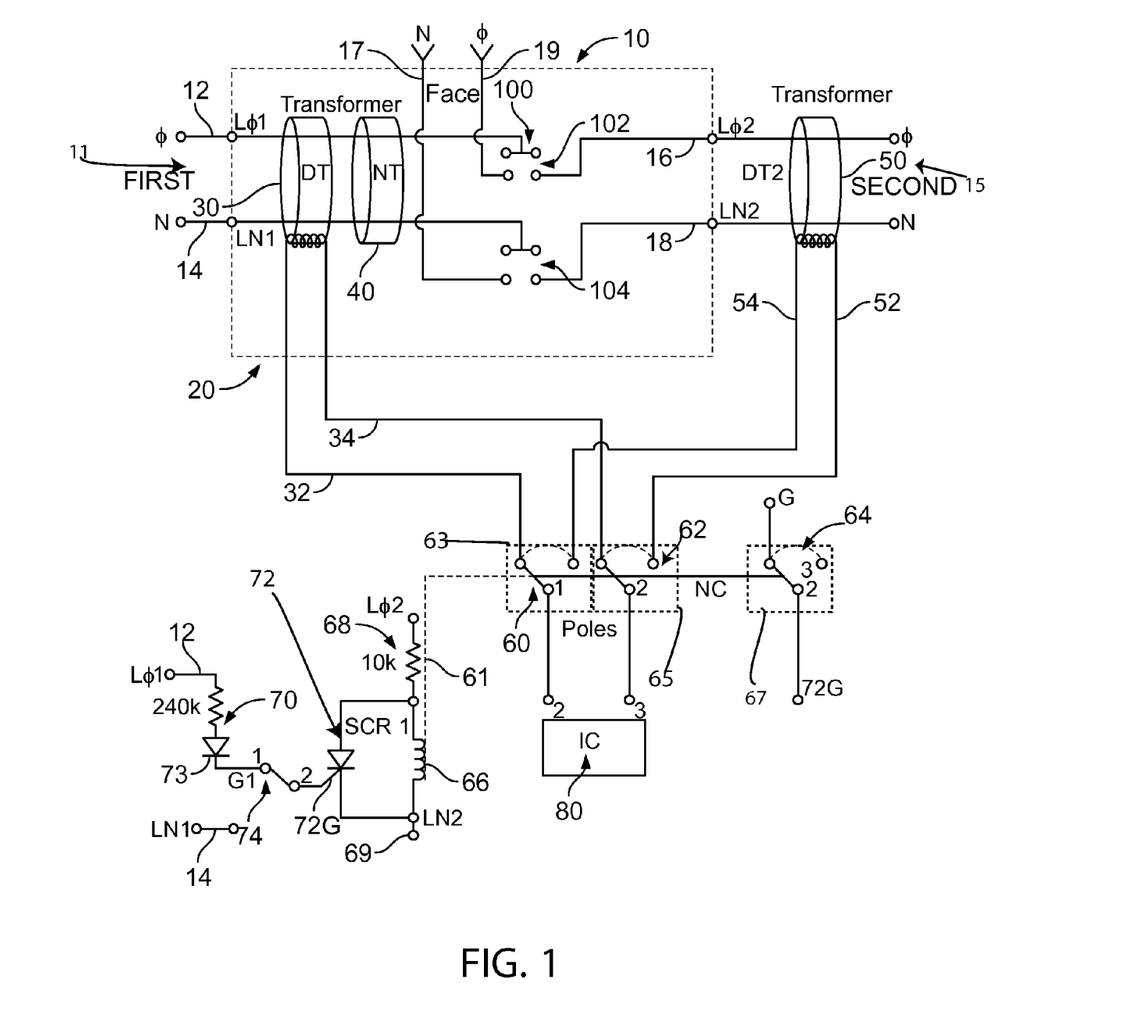
FIG. 1 is a simplified circuit diagram which shows a reverse wiring design having an additional transformer and an additional switching arrangement.

For example, FIG. 1 shows a simplified schematic block diagram showing a combination of the first set of switches and the third type of switch combined together. In this embodiment there is a default line side or first interface 11 and a default load side or second interface 15. Alternatively, first interface 11 can be a load side interface, while second interface 15 can be a line side interface when the device is reverse wired.

First side interface has phase line 12 and neutral line 14. Second side interface has load phase line 16 and load neutral line 18. Face lines 17 and 19 in the form of neutral face line 17 and phase face line 19 can be coupled to first side interface and second side interface via bridge mechanism 100 which includes bridge contacts 102 and 104 which selectively connect the first side interface 11 with the second side interface 15.

Lines 12 and 14 pass through differential transformer 30 and neutral transformer 40.

For example, with this embodiment, there is also another differential transformer 50 wherein lines 16 and 18 pass through differential transformer 50. Lines 32 and 34 are coupled to windings associated with differential transformer 30 wherein these lines feed into switches 60 and 62. In addition, lines 52 and 54 also feed into switches 60 and 62 as well from differential transformer 50. Switch 60 switches from a first position coupled to line 32 to a second position coupled to line 54, depending on whether a power input line is coupled to line interface 11 resulting in the first switching position or to line interface 15 resulting in the second switching position. Switch 62 switches from a first position coupled to line 34 to a second position coupled to line 52 depending on whether a power input line is coupled to first interface 11 resulting in the first switching position, or to second interface 15 resulting in the second switching position. Another switch 64 is for selectively connecting ground interface lines to a ground, so that switch 64 is in a first position when a power input line is coupled to line interface 11 or switch 64 is in a second position when the power input line is coupled to second interface 15.

One fault circuit component comprises an integrated circuit 80 which is coupled to the lines coupled to switches 60 and 62 so as to be coupled to the line inputs of either differential transformer 30 or differential transformer 50.

While the switches such as switches 60, 62 and 64 can be in the form of mechanically actuated switches, solid state switches can also be used. For example, these switches 60, 62, and 64 can be optionally substituted for solid state switches 63, 65, and 67 shown by dashed lines can be used instead of these mechanical switches. These solid state switches can be in the form of transistors, or transistor systems which create this same switching effect.

If the switches are mechanical switches, such as switches 60, 62, or 64, an actuator or actuator system can be used. For example, the actuator system may include, an SCR 72 operating as the switch actuator, an actuator comprising a coil 66 and a plunger 61 which acts on these switches in a known manner. In this embodiment, there is also another switch 74 which is used to selectively connect SCR 72 to power. For example, when a power input line is coupled to first side interface 11, switch 74 is in a first position coupled to first side phase line 12. Power then flows through resistor 70, through diode 73 and into gate 72g of SCR 72 opening the current path (closing the switch) in SCR 72 to set the switches in the first position. Thus, when wired in the first side, SCR 72 is biased on. When the system is reverse wired, the power line is connected to connection end 15, power flows through resistor 68 and through coil 66 in the opposite direction and onto point 69, which is connected to first side neutral line 18, with SCR 72 being closed (current path being closed, with the switch being open). Thus, when power input line is coupled to second interface 15 instead, switch 74 is switched to a second position so that it is coupled to first side neutral line 14. Thus, in the first position power flows through coil 66 in a first direction from first side phase line 12 to second side neutral line 18. Alternatively, in the second position, power flows in the opposite direction from the first side phase line to the second side neutral line 14.

Depending on the connected position of the power line, this controls the switching position of bi-directional coil or 66 which in this embodiment, is in the form of a coil driving a pin 61.

Figure 2A:
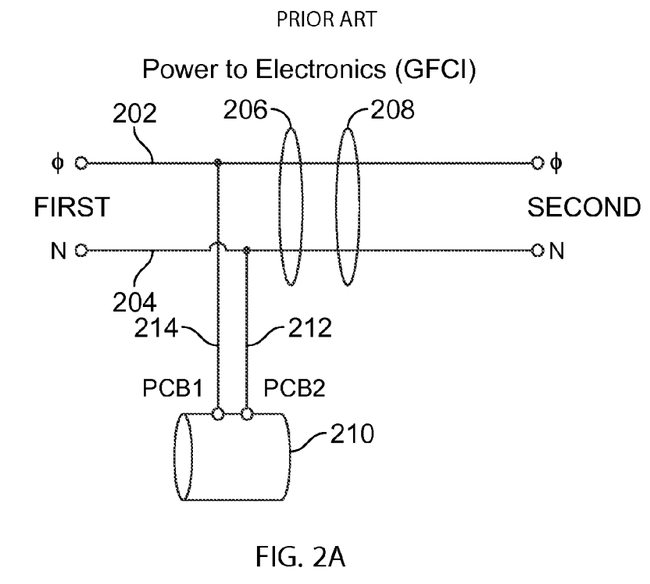
FIG. 2A is a simplified circuit diagram showing the power that is presented to the integrated circuit.

FIG. 2A shows a schematic block diagram showing a standard connection to power to electronics such as a printed circuit board. For example, phase line 202, and neutral line 204 extend through transformers 206 and 208 which are in the form of differential transformer 206 and grounded/neutral transformer 208. Lines 212 and 214 are coupled to integrated circuit 210 via power connection lines 212 and 214.

Figure 2B:
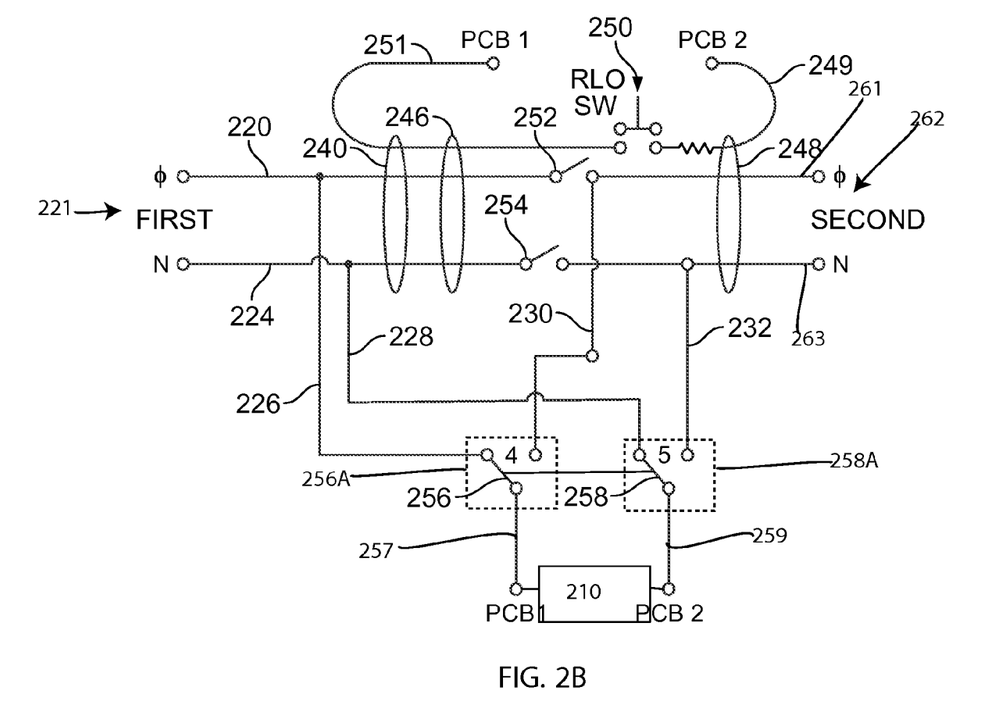
FIG. 2B is a simplified circuit diagram which shows reverse wiring protection for a reset lockout design having an additional loop.

FIG. 2B is a modified version of that shown in FIG. 2A. In this view, there is shown the switching connections between the printed circuit board 210 and either the first or second interfaces 221 or 262. In this view, first interface 221 includes first side phase line 220, first side neutral line 224, while second side interface 262 includes second side phase line 261, and second side neutral line 263. In at least one configuration, the first side interface 221 is configured as the default first side interface, while the second side interface 262 is configured as the default load side interface. Coupled between first interface 221, and second interface 262 is differential transformer 240, grounded/neutral transformer 246, and additional differential transformer 248. Coupled between differential transformer 240 and additional differential transformer 248 are a plurality of contacts such as bridge contacts 252 and 254. Bridge contact 252 selectively connects line 220 with line 261, while bridge contact 254 selectively connects phase line 224 with phase line 263. Switches 256 and 258 are used to switch between connections to selectively connect printed circuit board 210 with power.

For example, lines 226 and 230 are connected to respective phase lines 220 and 261 at a first end, and are connected to switch 256 at a second end. Switch 256 selectively switches between these lines depending on whether a power line is coupled to a first or default line side interface 221 or to a second or default load side interface 262. For example, when power line is coupled to first side interface 221, switch 256 is thrown to a first position wherein it connects printed circuit board 210 with first side phase line 220. Alternatively, when a power line is coupled to second side interface 262, switch 256 is thrown to the other, second position connecting printed circuit board 210 with phase line 261.

Lines 228 and 232 are respectively connected to neutral lines 224 and 263 at a first end and with switch 258 at a second end. Switch 258 is thrown to a first position wherein it connects printed circuit board 210 with first side neutral line 224. Alternatively, when a power line is coupled to second side interface 262, switch 256 is thrown to the other, second position connecting printed circuit board 210 with phase line 263. With this embodiment, there is also a reset lockout switch 250 which is coupled to a loop formed by lines 249 and 251. Ends of lines 249 and 251 are coupled to printed circuit board 210. Switches 256 and 258 are coupled via lines 257 and 259 to PCB 210.

Figure 2C:
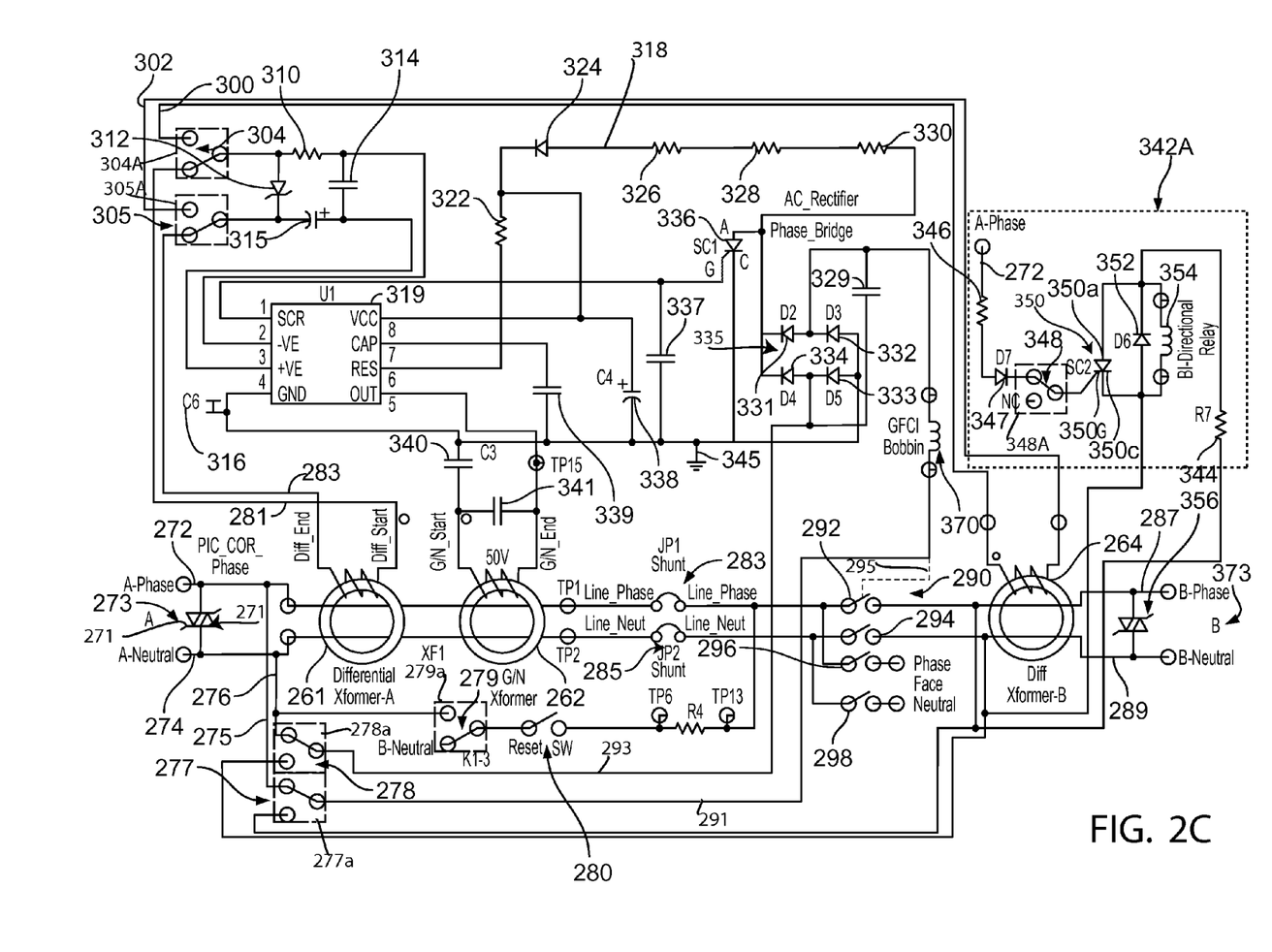
FIG. 2C is a circuit diagram for a fault circuit interrupter wherein there is an additional differential transformer which is used to protect against miswiring, and six switches comprising the switching arrangement.

FIG. 2C is a schematic block diagram showing the layout of a bi-directional switching fault circuit interrupter. In this view, there is a first or default line side interface 273 which has a first side phase line 272 and a first or line side neutral line 274 with a metal oxide varistor (MOV) 271 coupled between these lines to reduce power spikes. On the opposite connection end there is a second or default load side interface 373 including second side phase line 287 and second side neutral line 289 with metal oxide varistor 356 coupled between these lines. A bridge mechanism 290, including a plurality of bridged contacts 292, 294, 296 and 298, is positioned between these connection interfaces forming a first or default line side and a second or default load side. Differential transformer 261 and grounded/neutral transformer 262 are positioned on the first side while differential transformer 264 is positioned on the second side. Differential transformer 261 is configured to detect whether there is a current imbalance between phase line 272 and neutral line 274. Grounded/neutral transformer 262 is configured for reading a grounded/neutral condition in the line. Coupled within phase line 272 and neutral line 274 are shunts 283, and 285.

In this embodiment, there are different sets of switches. For example, there are power connection switches 277 and 278, differential transformer connection switches 304 and 305, a reset lockout switch 279, and an actuator switch 348. These different sets of switches can be in the form of mechanical latching switches known in the art or in the form of solid state switches such as transistors shown by dashed lines. These solid state switches 277a, 278a, 279a, 304a, 305a, and 348a are configured to provide substantially the same switching result as the mechanically configured switches.

An AC rectified bridge 335 formed by diodes 331, 332, 333, and 334 is coupled to power connection switches 277 and 278 via lines 291 and 293 respectively. Bridge 335 is configured to provide power to integrated circuit 319. To ensure that power is supplied to integrated circuit 319 regardless of whether power is coupled to first side interface 273 or second side interface 373, power connection switches 277 and 278 are configured to switch from a first position when power is coupled to first side interface 273, to a second position when power is coupled to second side interface 373. For example, when power is coupled to first side interface 273, power is fed into switches 277 and 278, with phase line 272 feeding into switch 277, and neutral line 274 feeding into switch 278. In addition, the oppositely spaced terminal end 373 has phase line 287 feeding into switch 277, while second side neutral line 289 feeds into switch 278.

Thus, switch 277 switches between first side phase line 272 and second side phase line 287, while switch 278 switches between first side neutral 274 and second side neutral line 289. With this configuration, rectified bridge 335 always receives power regardless of whether bridge contacts 292 are tripped and regardless of whether the first side is coupled to a power line or a second side is coupled to a power line. The output of switch 277 is fed into line 291, while the output of switch 278 is fed into line 293. These two lines feed into rectified bridge 335 with line 291 feeding power through the actuator 370 for bridged contacts 290. Actuator 370 includes a coil and a pin or plunger which is used to trip these bridged contacts. In addition, coupled between bridge 335 and actuator 370 is a capacitor 329 as well. With this design, when power is applied, and there is no fault, the contacts can be latched. When power is lost in actuator 370, a pin or plunger 295 is fired to unlatch bridge contacts 290.

Power from bridge 335 flows through line 318 which has a plurality of resistors 326, 328 and 330 in series along with diode 324 which regulate the power flow into integrated circuit 319. Resistor 322 is set to regulate the tripping voltage for integrated circuit 319.

Switches 304 and 305 are designed to switch between connections windings on differential transformers 261 and 264. Switches 304 and 305 have their output coupled into pins 2 and 3 of integrated circuit 319. Differential transformer 261 has output lines from its windings in the form of differential start line 281 and differential end line 283 coupled into switches 304 and 305, respectively. Additional differential transformer 264 has the output lines 300 and 302 from its windings input into switches 304 and 305 respectively. Thus, one end of switch 304 receives in its input either line 281 from differential transformer 261, or line 300 from differential transformer 264. The other end of switch 304 feeds into pin 2 of integrated circuit 319. In addition, one end of switch 305 receives in its input either line 283 of differential transformer 261, or line 302 of differential transformer 264. The output of this switch then feeds into pin 3 of integrated circuit 319. Coupled between switches 304 and 305 is zener diode 312, resistor 310 and capacitors 314, and 315 which are used to regulate the input into pins 2 and 3. Coupled between grounded/neutral transformer 262 and integrated circuit 319 are capacitors 316, 340, and 341 as well to regulate the form of input into integrated circuit 319.

Another switch 279 is for coupling in reset switch 280 to first side neutral line 274, or to second side neutral line 289 depending on the connection of the power line, so that when a power line is coupled to first side interface 273, switch 279 is switched to first side neutral line 274, while when the power line is coupled to second side interface 373 switch 279 is switched to second side neutral line 289.

Integrated circuit 319 can be in the form of any usable integrated circuit, such as but not limited to LM1851 made by National Semiconductor. In the case of a different integrated circuit, the effect would be substantially the same but may have different interconnections.

With the current design, pin 1 of integrated circuit is coupled to SCR 336. Pin 1 is designed to selectively trip SCR 336 in a known manner when it detects the presence of a fault. As discussed above, pins 2 and 3 are in communication with either differential transformer 261 or differential transformer 264 depending on the position of switches 304 or 305. Pins 4 and 5 are coupled to the windings of grounded neutral transformer 262. Pin 6 is coupled to a line having resistor 322 which as described above sets the threshold voltage or level for tripping. Pin 7 is coupled to capacitor 339 which serves as a timing capacitor or regulating capacitor for the tripping of integrated circuit 319. Coupled into pin 8 is the power input from bridge rectifier 335. In addition capacitor 338 is coupled along this line as well.

In this circuit, there are essentially two actuators, actuator 370 which is for actuating bridged contacts 290, while actuator system 342a, including bi-directional relay 354 is for switching switches 277, 278, 279, 304, 305, and 348. Actuator system 342a includes a switch 348 which switches between first side phase line 272, and a neutral contact. First side phase line 272 has a resistor 346 and a diode 347 coupled along this line into switch 348. When a power line is coupled to line interface 273, SCR 350 has power fed into gate 350g, opening this gate (opening the current path by closing the switch) thereby allowing power to flow in a first direction through coil or bi-directional relay 354. When power is coupled to second side interface 373, SCR gate 350G does not receive power, thereby closing this SCR (closing the current path by opening the switch) causing power to flow in the opposite direction through coil or bi-directional relay 354. Diode 352, coupled in parallel with relay 354, keeps the power flowing in one direction when a power line is coupled to interface 373. The switching position of bi-directional relay 354 controls the positioning of switches 277, 278, 279, 304, 305, and 348. Thus, when power is coupled to line interface 273, these switches are switched to the first position via actuator system 342a, while when power is coupled to second side interface 373, these switches are switched to the second position via actuator system 342a keeping integrated circuit supplied with power, and also in communication with the desired differential transformer.

Ultimately, when power is coupled to first side interface 273, a downstream load can be coupled to second side interface 373. Alternatively, when power is coupled to second side interface 373, a downstream load can be coupled to first side interface 273. These switches 277, 278, 279, 304, 305, and 348 ensure that regardless of whether the power line is coupled to first side interface 273, or second side interface 373, the fault circuit components are still configured to work to protect users against a fault condition.

Figure 3:
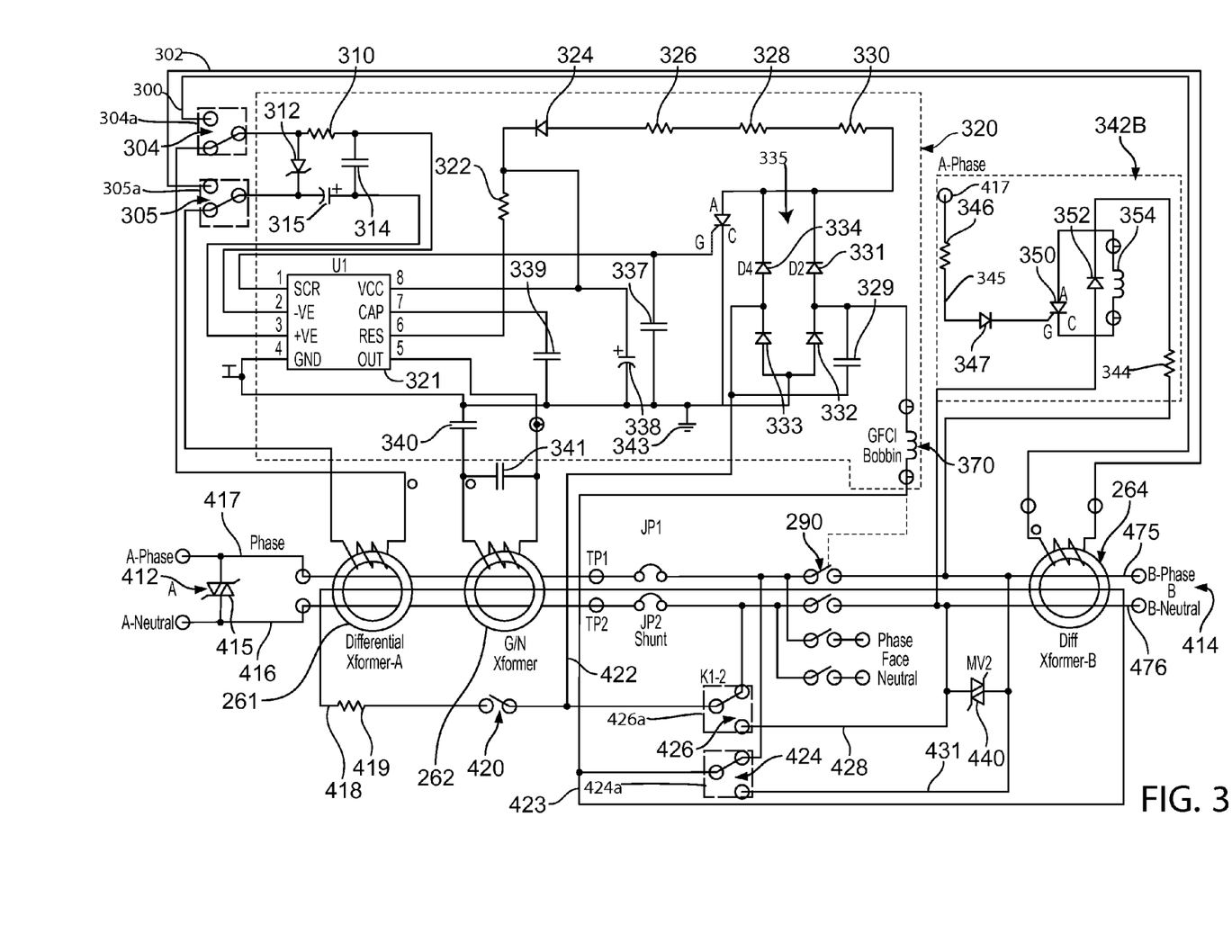
FIG. 3 is a circuit diagram which shows a four switch switching system which has an additional transformer as well.

FIG. 3 shows a circuit diagram which shows fault circuitry 320 which includes all of the circuitry enclosed in the dashed line and discussed above. In this embodiment, similar to the embodiment shown in FIG. 2C, there are transformers 261, 262, and 264 in the form of differential transformer 261, grounded/neutral transformer 262 and differential transformer 264. The first two transformers 261 and 262 are positioned to read current imbalances in lines 416 and 417 which are the neutral and phase lines of line or connection end 412. Opposite connection end 414 is the load connection end having a phase line 475, a second side neutral line 476 and a MOV 440 coupled between these lines. With this embodiment, there are four switches including switches 424, 426, 304, and 305. These switches are for selectively switching back and forth depending on how the device/system is wired. Because there are only three transformers, and two of the transformers are necessary for successful operation, either one of the differential transformers 261, or 264 would share grounded/neutral transformer 262 as discussed above. This design does not need as many switches as shown in FIG. 2C because of loop 418 which is shown extending through differential transformers 261, 262, and 264. Loop 418 is designed to operate with each of these transformers 261, 262 and 264 as well as with reset switch 420 which in at least one embodiment is in the form of a reset lockout switch 420 connected to loop 418 adjacent to resistor 419. This loop allows reset switch 420 to apply a current imbalance when reset switch 420 is pressed.

When power is properly connected to the line terminal end 412, power flows through lines 417 and 416 through line 345, and into the gate of SCR 350. This causes power to flow through solenoid 354 in a first direction, to set the latching of the switches 424, 426, 304, and 305 in the first set position. Alternatively, when terminal end 414 which is the line end, is coupled to a power line, instead of terminal end 412, power is sent through the coil of solenoid 354 in an opposite direction to selectively flip switches 424, 426, 304, and 305 from their original starting position to a secondary position.

For example, when the device is mis-wired, such as when the power line is coupled to second end 414, switches 424 and 426 would switch such that it would connect line 422 with line 428, and line 423 with line 431. In addition, switch 304 would be switched to connect to line 300, while switch 305 would be switched to connect to line 302.

Switch 424 is used to electrically connect solenoid 370 to power from either one of the phase lines 417 or 475. In addition, switch 426 is used to connect loop line 418 with neutral line 416, or with neutral line 476 on the first side and is used to provide power to bridge 335.

Switches 304 and 305 are used to switch between the winding lines of either differential transformer 261 or differential transformer 264. Regardless of the position of the switches, grounded/neutral transformer 262 has its winding lines connected to integrated circuit 319. In this way, if the device is wired correctly, differential transformer 261 remains active, along with grounded/neutral transformer 262. However, if the device is mis-wired, differential transformer 264 is now utilized along with grounded/neutral transformer 262.

In addition, as discussed above, solid state switches can be used such that solid state switches 424a, 426a, 304a, 305a are substituted for switches 424, 426, 304 and 305.

Figure 4:
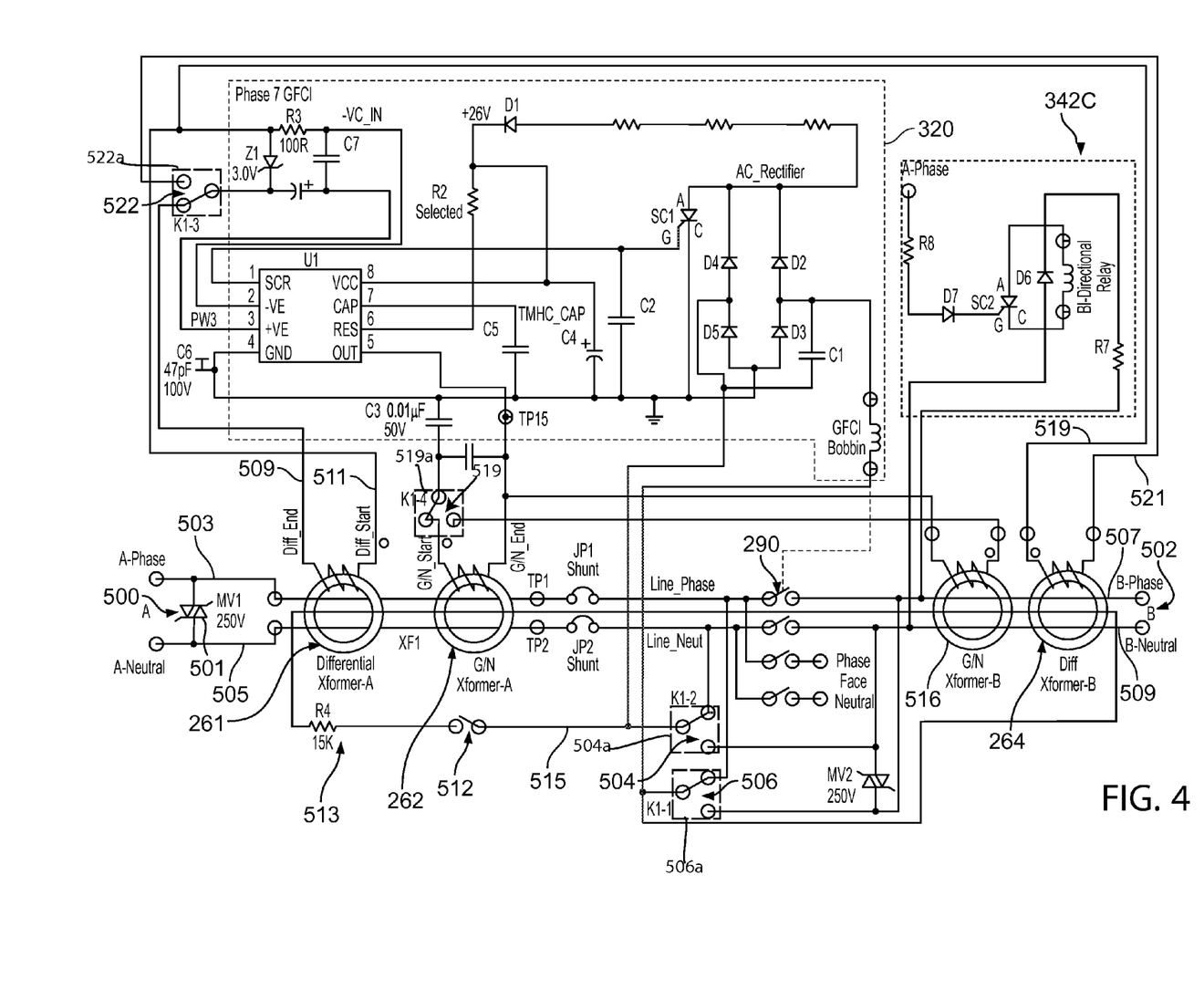
FIG. 4 is a circuit diagram which shows a four pole system wherein there is shown a reset lockout switch and four transformers.

FIG. 4 discloses a four transformer system with a line input end 500 and a load end 502. There are four different transformers 261, 262, 516, and 264. These transformers are selectively utilized depending on the wiring of the device. For example, differential transformer 261 and grounded/neutral transformer 262 are utilized when power is presented to face 500. Alternatively, grounded/neutral transformer 516, and differential transformer 518 are utilized when power is connected to end 502. This embodiment is a four pole or switch system, wherein a first pole or switch 506 is used to switch between a phase line 503 or phase line 507 to provide power to the circuit board and components 320. Switch 504 is used to connect or switch between either neutral line 505 or neutral line 509 to selectively connect these lines to loop line 515 which is used to enable both the reset switch 512, and the resistor 513.

Switch 522 is used to switch between line 509 extending from differential transformer 508, and line 521 extending from differential transformer 518. This switch insures that a reading from these differential transformers is fed into the integrated circuit. Lines 511 from differential transformer 261 and line 519 from differential transformer 264 are coupled together to feed into integrated circuit 319. All of the other components in this embodiment such as in circuitry 320 and actuator 342c, are similar to the elements shown in FIG. 3.

In addition, in this design, the switches 504, 506, 519 and 522 can be substituted by inserting solid state switches 504a, 506a, 519a and 522a which can be in the form of any solid state switches but in at least one embodiment, includes transistors to perform switching.

Figure 5:
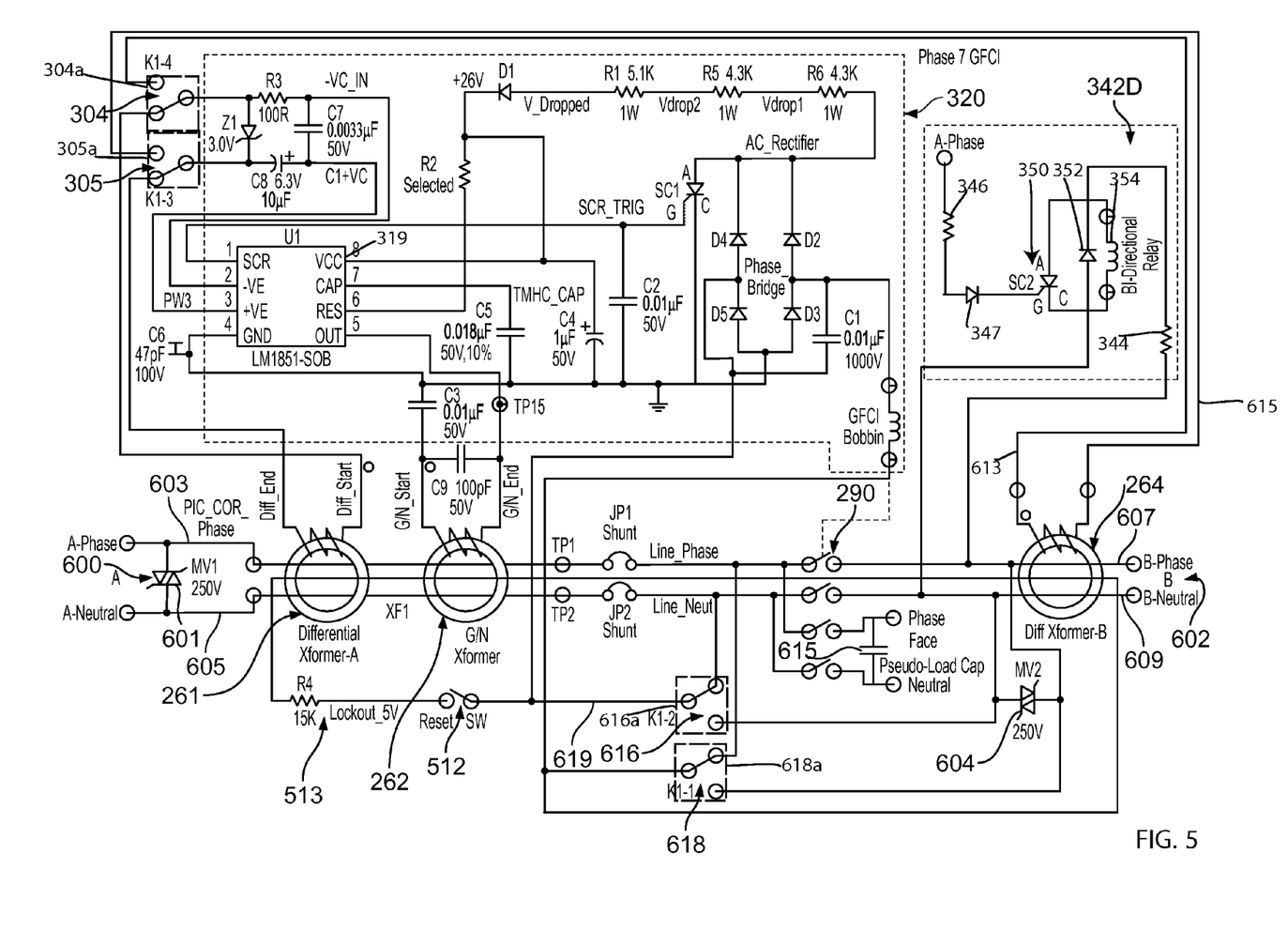
FIG. 5 is a circuit diagram which shows a plurality of transformers in a four switch system.

FIG. 5 is a circuit diagram for a device having three transformers and four switches. With this design, there is a first connection end 600 which is a line in connection end having a phase line 603, and a neutral line 605. In addition, there is a phase line 607 and neutral line 609 at line connection end 602 as well. Coupled along lines 603 and 605 are differential transformer 608 and grounded/neutral (G/N) transformer 610. Line connection end 600 has MOV 601 coupled between lines 603 and 605 while load connection end 602 has MOV 604 coupled between lines 607 and 609.

In this case, there is a differential transformer 264 which includes lines 613 and 615 which extend from this differential transformer to respective switches 305 and 304. switches 305 and 304 are formed as switching poles which are designed to selectively connect transformer 264 to the electronic components 320. In addition, switches 616 and 618 are used to selectively switch between a connection of input lines 603 and 605 and lines 607 and 609 which are used to selectively send power to electrical components associated with circuit components 320. In this way, these electrical components such as bridge 335 in circuit components 320 are energized regardless of how the device is wired.

This device also shows an actuator in the form of actuator components 342d which is similar to actuator components 342B and 342C. Actuator components 342D include a bi-directional relay 354 which is powered and thrown in a first direction via a connection to line 603 or thrown in a second direction when connected to a connection to lines 607 and 609.

In addition, in this design, the switches 304, 305, 616, and 618, can be substituted by inserting solid state switches 304a, 305a, 616a, and 618a, which in at least one embodiment, includes transistors to perform switching.

Figure 6:
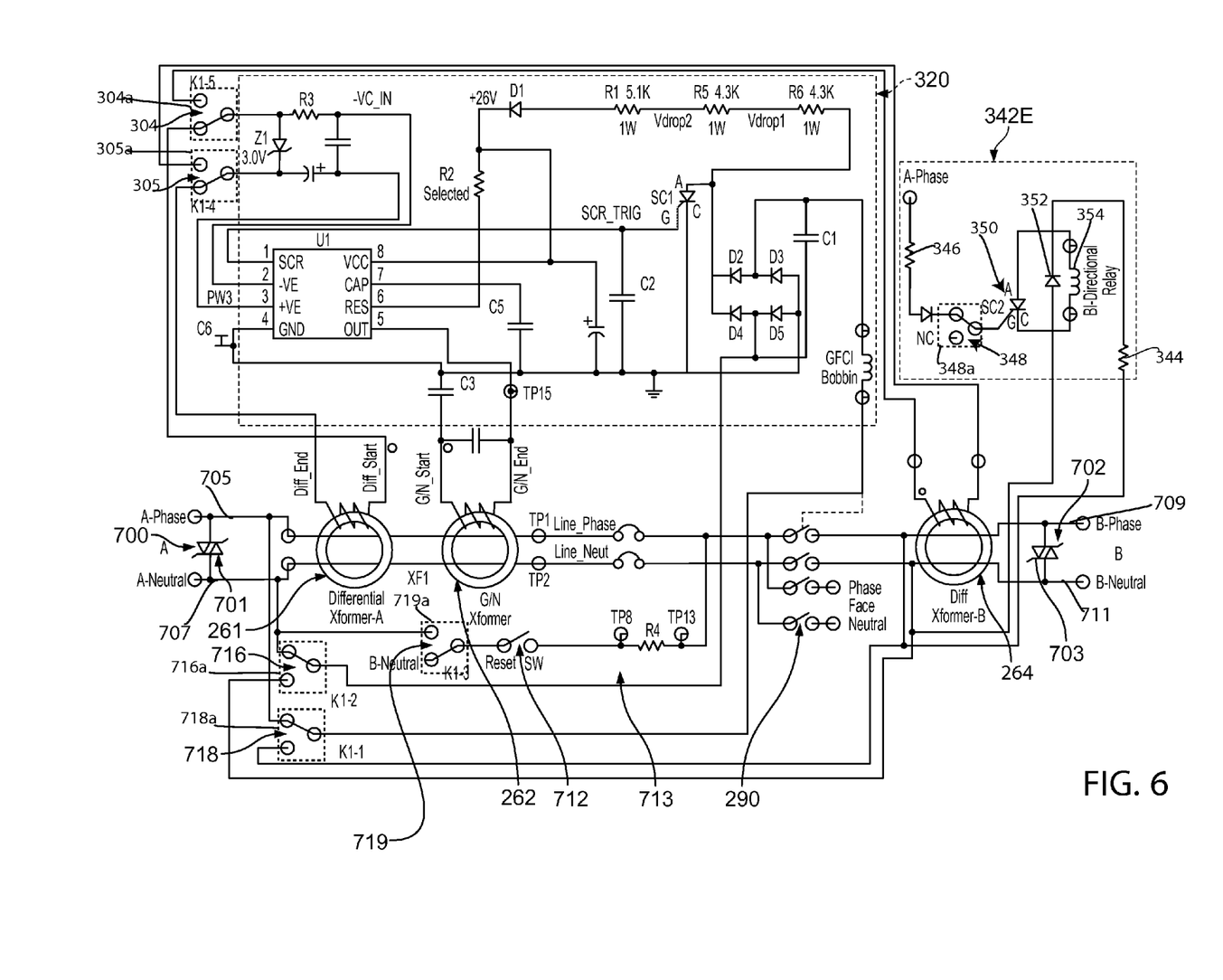
FIG. 6 is a six switch system which shows a bi directional system with three different transformers.

FIG. 6 shows another embodiment which discloses a six pole/switch, three transformer switching device having two different connection ends 700 and 702 for respective line and load connections. There are three different transformers 261, 262, and 264 and six poles or switches 716, 718, 719, 305, 304, and 348. Switches 716 and 718 form first and second poles for switching between power connection lines 705 and 707 which are respectively phase and neutral connection lines, and power connection lines 709 and 711 which are respectively phase and neutral connection lines. The switching of these poles is for selective connection to the electronic components 320.

Switch/pole 719 selectively switches between lines 707 and 711. This switch 719 is for selective connection to a reset switch 712. Fourth and fifth switches 305 and 304 are for selectively connecting differential transformer 261 to integrated circuit 319 or to connect differential transformer 264 to integrated circuit 319, so that regardless of how the device is wired, the proper signals from either one of the differential transformers 261 and 264 are presented to the electronic components 320. For example, in the first position when power is coupled to connection end 700, switches 305 and 304 are switched to receive input from differential transformer 261. When power is coupled to connection end 702, these switches 305 and 304 can also switch over so that they can receive information from differential transformer 264 as well.

Control of this switching is via controller or actuator elements 342E which include a sixth switch 348 as well. Switch 348 switches between lines 705 and 711 to selectively power the controller elements 342E. Thus, regardless of how the device is wired, the above mentioned poles selectively switch from a first position to a second position so that the electronic components 320 can be selectively powered, and also selectively receive signals, and the controller 342E can also selectively receive power as well. In the designs shown in FIGS. 4-6, particular values for resistors, diodes and capacitors are shown, however these values are shown for the purpose of showing an example, and are not to be construed as limitations or required components of these embodiments or the embodiments shown in FIGS. 1-3 either.

In addition, in this design, the switches 304, 305, 348, 716, 718, and 719 can be substituted by inserting solid state switches 304a, 305a, 348a, 716a, 718a, and 719a which in at least one embodiment includes transistors to perform switching.

In all, these designs allow for the use of transformers so that regardless of how the devices are wired, the different transformers including a differential transformer or a ground/neutral transformer are available for use, and provide protection for a user.

In addition, while the foregoing describes the device having at least one line interface and at least one load interface, it should be understood that this device is not limited to having a designated line or load interface. The device may simply have a first and second interface, either of which may be connected to line and the other being connected to load.

Accordingly, while a few embodiments of the present invention have been shown and described, it is to be understood that many changes and modifications may be made thereunto without departing from the spirit and scope of the invention as defined in the appended claims.

What is claimed is:

1. A bi-directional switching system for a fault circuit interrupter which is connectable to a power line, the system comprising:

a) a plurality of electrical conductors having a line side and a load side;
b) at least one circuit interrupter disposed along said plurality conductors and configured to selectively electrically isolate said line side from said load side;
c) a plurality of transformers comprising at least two differential transformers and at least one grounded/neutral transformer, wherein at least one of said at least two differential transformers is positioned on a line side, and at least one differential transformer is positioned on a load side;
d) at least two electrical connection interfaces comprising at least one first interface and at least one second interface disposed to connect to at least one power line, wherein said first connection interface is positioned on one side of said circuit interrupter and said second connection interface is positioned on an opposite side of said circuit interrupter;
wherein said plurality of electrical conductors extending from said at least two electrical connection interfaces, and said plurality of transformers, said plurality of electrical conductors including at least one line conductor, at least one load conductor and at least one transformer conductor, which is configured to electrically connect to at least one of said plurality of transformers;
d) at least one fault circuit component; and
e) a plurality of switches coupled to said at least one line conductor, said at least one load conductor, and said at least one transformer conductor, said plurality of switches disposed to switch electrical connections between said at least one first interface and said at least one second interface to selectively connect said at least one fault circuit component to either said at least one first interface or to said at least one second interface via at least one of said plurality of electrical conductors.

2. The system as in claim 1, further comprising at least one actuator disposed to selectively switch at least one of said plurality of switches depending on whether an electrical connection is made between the power line and said at least one first interface, or between the power line and said at least one second interface.

3. The system as in claim 2, wherein said at least one actuator is a bi-directional relay.

4. The system as in claim 2, wherein said actuator further comprises a silicon-controlled-rectifier.

5. The system as in claim 4, wherein said actuator further comprise a bi-directional relay which is energized by power connecting to either said at least one first interface or to said at least one second interface, wherein said bi-directional relay is disposed to switch in a first direction when said at least one first interface is connected to power, and wherein said bi-directional relay is disposed to switch in a second direction when said at least one second interface is connected to power.

6. The system as in claim 1, further comprising at least one loop extending through said plurality of transformers.

7. The system as in claim 6, further comprising a plurality of contacts and at least one reset switch disposed to reset said plurality of contacts after the system is tripped.

8. The system as in claim 7, wherein said reset switch is coupled to said at least one loop.

9. The system as in claim 7, further and at least one reset lockout switch which is disposed to test whether the fault circuit components are working before resetting said plurality of contacts.

10. The system as in claim 1, wherein said plurality of switches are solid state switches.

11. The system as in claim 10, wherein said plurality of solid state switches comprise transistors.

12. The system as in claim 1, wherein said at least one fault circuit component comprises:
at least one integrated circuit disposed to detect if a fault has occurred;
at least one bridge rectifier disposed to provide power to said at least one integrated circuit;
wherein said plurality of electrical conductors comprise plurality of lines, wherein at least a first line of said plurality of lines has a first end coupled to said at least one first interface and at least a second line of said plurality of lines has a first end coupled to said at least one second interface;
wherein a second end of said at least one first line, and a second end of said at least one second line are coupled to said at least one bridge rectifier; and
at least one switch configured to switch among said at least one first line and said at least one second line to selectively provide power to said at least one bridge rectifier depending on whether an electrical power line is coupled to said at least one first interface or to said at least one second interface.

13. The system as in claim 12, further comprising at least one additional grounded/neutral transformer.

14. The system as in claim 12, further comprising at least one actuator disposed to selectively switch at least one of said plurality of switches depending on whether an electrical connection is made between said at least one power line and said at least one first interface, or between said at least one power line and said at least one second interface.

15. A bi-directional switching system for a fault circuit interrupter which is connectable to a power line, the system comprising:
a) a plurality of transformers comprising at least two differential transformers and at least two grounded/neutral transformers;
b) at least two electrical connection interfaces comprising at least one first interface and at least one second interface disposed to connect to at least one power line;
c) a plurality of electrical conductors extending from said at least two electrical connection interfaces, and said plurality of transformers, said plurality of electrical conductors including at least one line conductor, at least one load conductor and at least one transformer conductor, which is configured to electrically connect to at least one of said plurality of transformers;
d) at least one fault circuit component; and
e) a plurality of switches coupled to said at least one line conductor, said at least one load conductor, and said at least one transformer conductor, said plurality of switches disposed to switch electrical connections between said at least one first interface and said at least one second interface to selectively connect said at least one fault circuit component to either said at least one first interface or to said at least one second interface via at least one of said plurality of electrical conductors.

16. The system as in claim 15, wherein said plurality of switches selectively switch between a select series of said plurality of electrical conductors that are coupled to said at least two differential transformers.

17. The system as in claim 15, wherein said at least one fault circuit component comprises: at least one integrated circuit disposed to detect if a fault has occurred;
wherein a portion of said plurality of electrical conductors comprise a plurality of lines, wherein at least a first line of said plurality of lines has a first end coupled to a first differential transformer selected from said at least two differential transformers; and at least a second line of said plurality of lines has a first end coupled to a second differential transformer selected from said at least two differential transformers;
wherein a second end of said at least one first line, and a second end of said at least one second line are coupled to said at least one integrated circuit;
at least one switch configured to switch among said at least one first line and said at least one second line.

18. The system as in claim 17, further comprising at least one additional grounded/neutral transformer.

19. The system as in claim 17, further comprising at least one actuator disposed to selectively switch at least one of said plurality of switches depending on whether an electrical connection is made between said at least one power line and said at least one first interface, or between said at least one power line and said at least one second interface.

20. A bi-directional switching system for a fault circuit interrupter which is connectable to a power line, the system comprising:
a) a plurality of electrical conductors having a line side and a load side;
b) at least one circuit interrupter disposed along said plurality conductors and configured to selectively electrically isolate said line side from said load side;
c) a plurality of transformers comprising at least two differential transformers and at least one grounded/neutral transformer wherein at least one of said at least two differential transformers is positioned on a line side, and at least one differential transformer is positioned on a load side;
d) at least two electrical connection interfaces comprising at least one first interface and at least one second interface disposed to connect to at least one power line;
e) wherein said plurality of electrical conductors extend from said at least two electrical connection interfaces, and said plurality of transformers, said plurality of electrical conductors including at least one line conductor, at least one load conductor and at least one transformer conductor, which is configured to electrically connect to at least one of said plurality of transformers;
e) at least one fault circuit component; and
f) a plurality of switches coupled to said at least one line conductor, said at least one load conductor, and said at least one transformer conductor, said plurality of switches disposed to switch electrical connections between said at least one first interface and said at least one second interface to selectively connect said at least one fault circuit component to either said at least one first interface or to said at least one second interface via at least one of said plurality of electrical conductors;
at least one reset switch;
wherein said plurality of electrical conductors comprise a plurality of lines, wherein at least a first line of said plurality of lines has a first end coupled to said at least one first interface and at least a second line of said plurality of lines has a first end coupled to said at least one second interface;
wherein a second end of said at least one first line, and a second end of said at least one second line are coupled to said at least one reset switch; and
at least one switch configured to switch among said at least one first line and said at least one second line to selectively electrically connect to said at least one reset switch depending on whether an electrical power line is coupled to said at least one first interface or to said at least one second interface.

21. The system as in claim 20, further comprising at least one additional grounded/neutral transformer.

22. The system as in claim 20, further comprising at least one actuator disposed to selectively switch at least one of said plurality of switches depending on whether an electrical connection is made between said at least one power line and said at least one first interface, or between said at least one power line and said at least one second interface.

23. A bi-directional switching system for a fault circuit interrupter which is connectable to a power line, the system comprising:
   a) a plurality of transformers comprising at least two differential transformers and at least one grounded/neutral transformer;
   b) at least two electrical connection interfaces comprising at least one first interface and at least one second interface disposed to connect to at least one power line;
   c) a plurality of electrical conductors extending from said at least two electrical connection interfaces, and said plurality of transformers, said plurality of electrical conductors including at least one line conductor, at least one load conductor and at least one transformer conductor, which is configured to electrically connect to at least one of said plurality of transformers;
   d) at least one circuit interrupter disposed along said plurality conductors and configured to selectively electrically isolate said line conductor from said load conductor wherein a first differential transformer of said at least two differential transformers is coupled to said line side and at least a second differential transformer is coupled to a load side;
   e) at least one fault circuit component which is configured to detect whether there is a sufficient voltage across at least one line coupled to windings on a differential transformer, to detect whether a fault has occurred;
   f) at least one bridge rectifier; and
   f) a plurality of switches coupled to said at least one line conductor, said at least one load conductor, and said at least one transformer conductor, said plurality of switches comprising a bi-directional relay disposed to switch electrical connections between said at least one first interface and said at least one second interface to selectively connect said at least one fault circuit component and said at least one bridge rectifier to either said at least one first interface or to said at least one second interface via at least one of said plurality of electrical conductors depending on whether power is applied to said first interface or said second interface.

24. A bi-directional switching system for a fault circuit comprising:
   a) a plurality of transformers comprising at least two differential transformers including a first differential transformer and a second differential transformer, and at least one grounded/neutral transformer;
   b) at least two electrical connection interfaces comprising at least one first interface and at least one second interface disposed to connect to at least one power line;
   c) at least one bridge rectifier;
   d) at least one integrated circuit being configured to receive power from said at least one bridge rectifier;
   e) a plurality of electrical conductors extending from said at least two electrical connection interfaces, and said plurality of transformers, said electrical conductors comprising:
      i) power conductors being adapted to selectively couple said at least one bridge rectifier to each of said at least two electrical connection interfaces,
      ii) a plurality of detecting conductors being adapted to selectively couple said at least one integrated circuit to at least one of said first differential transformer and said second differential transformer;
   f) a plurality of switches for switching between a first position and a second position, wherein there is at least one switch coupled along said power conductors, and at least one switch coupled along said detecting conductors; and
   g) at least one actuator in the form of a bi-directional relay disposed to selectively switch at least one of said plurality of switches depending on whether an electrical connection is made from at least one power line to said at least one first interface or to said at least one second interface;
   wherein when the power line is coupled to said at least one first interface said at least one actuator switches at least one of said plurality of switches to a first position, connecting said at least one bridge rectifier to said first interface, and connecting said at least one integrated circuit to said plurality of detecting conductors associated with said first differential transformer, and
   wherein when the power line is coupled to said at least one second interface, said at least one actuator switches at least one of said plurality of switches to a second position, connecting said at least one bridge rectifier to said second interface and connecting said at least one integrated circuit to said plurality of detecting conductors associated with said second differential transformer.

25. A method for selectively connecting components of a fault circuit included in a fault circuit interrupter to a power line, wherein the fault circuit interrupter comprises at least two terminals including a first terminal and a second terminal, a plurality of switching elements, and at least one fault circuit coupled to the switching elements, the method comprising:
   a) connecting a power line to at least one of the at least two terminals;
   b) determining which of said at least two terminals is coupled to the power line; and
   c) selectively switching using a bi-directional switching system using the plurality of switching elements to connect the components of the fault circuit to the power line wherein said bi-directional switching system switches between a first interface and a second interface, wherein when a power line is coupled to said first interface, said bi-directional switching system switches to couple to said first interface to receive power from said first interface, thereby providing power to at least one bridge rectifier and at least one fault circuit component, and when a power line is coupled to said second interface, said bi-directional switching system couples to said second interface to receive power from said second interface to provide power to said at least one bridge rectifier and said at least one fault circuit component.

26. The method as in claim 25, wherein said step of determining which of said at least two terminals is coupled to the power line includes triggering a silicon controlled rectifier to cause an actuator to act on the switching elements to selectively connect the components of the fault circuit to the power line.

27. The method as in claim 25, wherein said step of determining which of said at least two terminals is coupled to the power line includes latching at least one of the plurality of switching elements to a first position, and coupling at least one actuator to a select one of the at least two terminals, and selectively actuating at least one of the plurality of switching elements to selectively connect the components of the fault circuit to the power line.

28. The method as in claim 25, wherein said step of selectively switching comprises switching at least one of a plurality of solid state switches from a first position to a second position.

29. The method as in claim 25, wherein said step of selectively switching comprises switching from a first position to a second position to connect the fault circuit components to the power line.

30. The method as in claim 29, wherein said step of selectively switching comprises switching from a first position to a second position to connect a bridge rectifier to the power line so that said bridge rectifier provides power to the fault circuit components.

31. The method as in claim 29, wherein said step of selectively switching comprises switching from a first position to a second position to connect the windings of a differential transformer to an integrated circuit.

32. A bi-directional switching system for a fault circuit interrupter which is connectable to a power line, the system comprising:
  a) a plurality of transformers comprising at least one differential transformer and at least one grounded/neutral transformer;
  b) at least two electrical connection interfaces comprising at least one first interface and at least one second interface disposed to connect to at least one power line;
  c) a plurality of electrical conductors extending from said at least two electrical connection interfaces, and said plurality of transformers, said plurality of electrical conductors including at least one line conductor, at least one load conductor and at least one transformer conductor, which is configured to electrically connect to at least one of said plurality of transformers;
  d) at least one fault circuit component;
  e) at least one bridge rectifier; and
  e) a plurality of switches comprising at least one of a bi-directional switching system coupled to said at least one line conductor, said at least one load conductor, and said at least one transformer conductor, said plurality of switches disposed to switch electrical connections between said at least one first interface and said at least one second interface to selectively connect said at least one fault circuit component and said at least one bridge rectifier to either said at least one first interface or to said at least one second interface via at least one of said plurality of electrical conductors; and
  f) at least one actuator disposed to selectively switch at least one of said plurality of switches from a first position to a second position, connecting said fault circuit component and sad at least one bridge rectifier to power depending on whether an electrical connection is made between said at least one power line and said at least one first interface, or between said at least one power line and said at least one second interface.

33. The bi-directional switching system as in claim 32, wherein said at least one actuator includes a detector for determining whether said at least one first interface is connected to a power line or said at least one second interface is connected to a power line.

34. The bi-directional switching system as in claim 32, wherein said detector comprises a silicon controlled rectifier (SCR).

* * * * *